United States Patent

[11] 3,559,979

[72] Inventor Alf John Muller
 Bittenfeld, Wurttemberg, Germany
[21] Appl. No. 766,609
[22] Filed Oct. 10, 1968
[45] Patented Feb. 2, 1971
[73] Assignee Daimler-Benz Aktiengesellschaft
 Stuttgart-Unterturkheim, Germany
[32] Priority Oct. 12, 1967
[33] Germany
[31] 1,625,525

[54] RUBBER METAL COLLAR END-BEARING
 2 Claims, 1 Drawing Fig.
[52] U.S. Cl. ................................................. 267/1
[51] Int. Cl. ................................................. F16f 16/12
[50] Field of Search ........................................... 267/153,
 139, 140, 141, 151, 152, 63

[56] References Cited
UNITED STATES PATENTS
2,273,869 2/1942 Julien .......................... 267/1(53)
FOREIGN PATENTS
615,608 2/1961 Canada ........................ 267/1(53)

*Primary Examiner*—James B. Marbert
*Attorney*—Craig, Antonelli, Stewart & Hill

ABSTRACT: A rubber-metal collar end-bearing which includes an inner metal bushing, a rubber part vulcanized to the outer surface of the metal bushing and provided with a collar, and a metal sleeve vulcanized into the rubber part as well as a metal disc vulcanized into the rubber part within the area of the collar thereof; the metal sleeve and the metal disc are preferably made in one piece in the form of a flange-bushing.

PATENTED FEB 2 1971
3,559,979
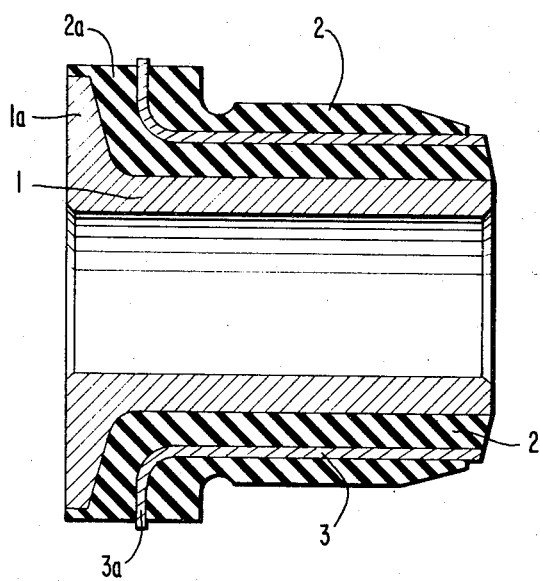
INVENTOR
ALF JOHN MÜLLER
BY Craig & Antonelli
ATTORNEYS

RUBBER METAL COLLAR END-BEARING

The present invention relates to a rubber-metal collar end-bearing with an inwardly disposed metal bush and a rubber part vulcanized to the outer surface thereof and provided with a collar. Such bearings are utilized, for example, in the motor vehicle construction for the absorption of the guide forces from the guide members to the wheel guide system whereby the requirements are made that the bearings possess as small as possible a torsional spring stiffness with the greatest possible radial and axial spring stiffness.

The rubber-metal bearings of this type, however, produce for the most part an excessive restoring moment during twisting whereby, there results, on the one hand, a considerable spring stiffening and, on the other, with the utilization of such types of bearings for the aforementioned application, an excessively large influence of the bearings on the height position of the vehicle.

Consequently, rubber-metal collar end-bearings of the aforementioned type have already been proposed in which a cylindrical metal sleeve is vulcanized into the rubber part. The radial spring stiffness is increased by this measure without increasing the torsional spring stiffness.

With collar end-bearings, which are also able to absorb axial forces, the rubber collar of the bearing shares a very large proportion in the torsional spring stiffness because the restoring moment of the rubber collar acts thereat on a large diameter.

Consequently, the present invention aims at creating a rubber-metal collar end-bearing in which the torsional moment of the rubber collar is reduced without considerably increasing thereby the axial spring softness or elasticity.

Accordingly, a rubber-metal collar end-bearing is proposed which includes an inwardly disposed metal bush, a rubber part vulcanized to the outer surface thereof and provided with a collar, and a metal sleeve vulcanized into the rubber part, in which according to the present invention a metal disc is vulcanized into the rubber part within the area of the collar.

Advantageously, the metal sleeve and the metal disc may be constructed in one piece in the form of a flange-bushing.

According to a further preferred construction of the present invention, also the inwardly disposed metal bush is constructed as flange-bushing.

Finally, it may be of advantage if the wall thickness of the collar of the last-mentioned flange bushing decreases with increasing diameter and the collar of the rubber part has a corresponding conical shape.

It is achieved by the vulcanizing of a disc or of a flange of a flange-bushing into the rubber part within the area of the collar that the rubber cannot deflect unlimitedly in the radial direction with axial loads. This means that the wall thickness of a rubber part can be increased and therewith, with a given load, the torsional moment can be reduced without the fact that the axial spring stiffness becomes smaller thereby.

If the inwardly disposed bush is constructed as flange-bushing, it is achieved by the decrease of the wall thickness of the collar with increasing diameter that also the collar of the rubber part receives a conical shape in such a manner that with an increasing diameter its wall thickness increases as viewed in the axial direction. However, as a result thereof, the torsion stress in the collar of the rubber part becomes more uniform during twisting of the bearing because the peak stresses occur at the largest diameter.

Accordingly, it is an object of the present invention to provide a rubber-metal collar end-bearing which avoids by simple means the aforementioned shortcomings and drawbacks encountered heretofore in the prior art.

Another object of the present invention resides in a rubber-metal collar end-bearing of the type described above which possesses as small as possible a torsional spring stiffness with largest possible radial and axial spring stiffness.

A further object of the present invention resides in the rubber-metal end-bearing of the type described above in which the restoring moments are reduced to acceptable magnitudes without significantly increasing the axial resiliency or elasticity.

These and further objects, features and advantages of the present invention will become more obvious from the following description when taken in connection with the accompanying drawing which shows, for purposes of illustration only, one embodiment in accordance with the present invention, and wherein:

The single FIG. is an axial cross-sectional view through one embodiment of a collar end-bearing in accordance with the present invention.

Referring now to the single FIG. of the drawing, reference numeral 1 designates therein the inwardly disposed flange-bushing; a rubber part 2 which includes a collar 2a, is vulcanized to the outer surface of the flange-bushing 1. A flange-bushing 3 is so vulcanized into the rubber part 2 that the flange or collar 3a thereof is disposed within the area of the collar or flange 2a of the rubber part 2.

The wall thickness of the flange 1a of the flange-bushing 1 decreases with increasing diameter so that also the collar 2a of the rubber part 2 receives a conical shape.

While I have shown and described only one embodiment in accordance with the present invention, it is understood that the same is not limited thereto but is susceptible of numerous changes and modifications as known to persons skilled in the art. For example, in lieu of a unitary flange-bushing 3, 3a, the bushing 3 and the disclike portion 3a may be made of separate parts. Thus, it is obvious the present invention is susceptible of numerous changes and modifications and I therefore do not wish to be limited to the details shown and described herein but intend to cover all such changes and modifications as are within the scope of those skilled in the art.

I claim:

1. A rubber-metal collar end-bearing which includes an inwardly disposed metal bush constructed as a flange-bushing, wherein the wall thickness of the flange of the inwardly disposed flange-bushing decreases with increasing diameter, a rubberlike part vulcanized to the outer surface of the metal bush and provided with a collar having a corresponding conical shape, and a metal sleeve vulcanized into the rubberlike part, characterized in that a metal disc is vulcanized into the rubber part within the area of the collar thereof.

2. A rubber-metal collar end-bearing according to claim 1, wherein the metal sleeve and metal disc are made in one piece in the form of a flange-bushing.